US012615505B2

(12) United States Patent
Osborn et al.

(10) Patent No.: US 12,615,505 B2
(45) Date of Patent: Apr. 28, 2026

(54) SECURELY ENABLING WORK PROFILES ON DEVICES VIA A SUBSCRIBER IDENTITY MODULE CARD

(71) Applicant: BOOST SUBSCRIBERCO L.L.C., Englewood, CO (US)

(72) Inventors: Stacey Osborn, Arvada, CO (US); Stephen P. Williams, Evergreen, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 283 days.

(21) Appl. No.: 18/456,773

(22) Filed: Aug. 28, 2023

(65) Prior Publication Data

US 2025/0080967 A1 Mar. 6, 2025

(51) Int. Cl.
*H04W 8/18* (2009.01)
*H04W 8/20* (2009.01)
*H04W 12/40* (2021.01)
*H04W 12/72* (2021.01)

(52) U.S. Cl.
CPC ........... *H04W 8/183* (2013.01); *H04W 8/205* (2013.01); *H04W 12/40* (2021.01); *H04W 12/72* (2021.01)

(58) Field of Classification Search
CPC ..... H04W 8/183; H04W 8/205; H04W 12/40; H04W 12/72
See application file for complete search history.

(56) References Cited

U.S. PATENT DOCUMENTS

2011/0306318 A1* 12/2011 Rodgers ................. H04W 4/50
455/410
2022/0279354 A1* 9/2022 Chandrappa ........ H04W 12/086

* cited by examiner

*Primary Examiner* — Ayodeji O Ayotunde
(74) *Attorney, Agent, or Firm* — Capitol City TechLaw; Jasbir Singh

(57) ABSTRACT

A method is disclosed for facilitating work-related tasks on a device with a Subscriber Identity Module (SIM). The method includes providing a work profile to access work-related tasks over a work network; retrieving identity data from the SIM; verifying the device based on the identity data; enabling, after a successful verification of the device, access to the work network via a SIM network associated with the identity data; and activating, after the successful verification, the work profile. This method provides a secure way to manage work profiles on devices, ensuring that only authorized users can access work-related resources and enhancing productivity in a work environment.

20 Claims, 1 Drawing Sheet

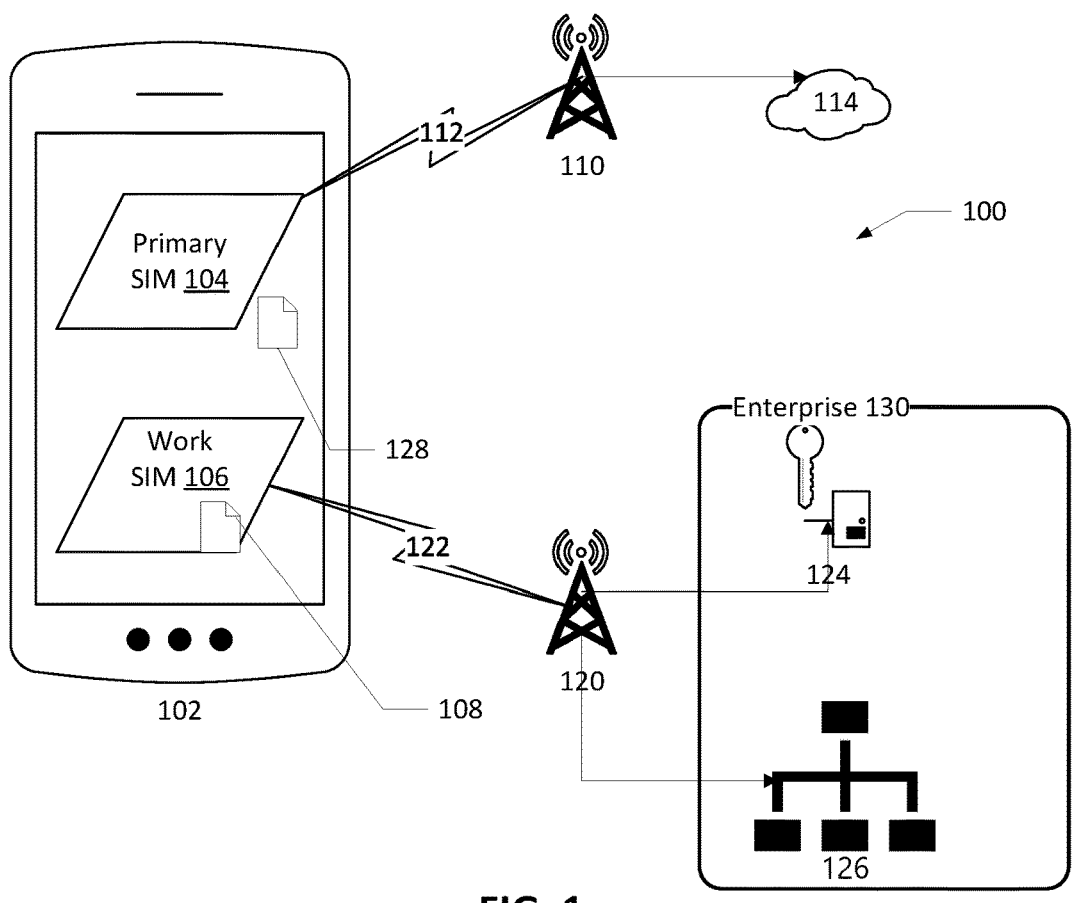

Primary SIM 104

112

110

114

128

Work SIM 106

122

Enterprise 130

124

120

108

102

126

---

200

| Providing a work profile to access work-related tasks over a work network | 210 |

| Retrieving identity data from the sim | 220 |

| Verifying the device based on the identity data | 230 |

| Enabling, after a successful verification of the device, access to the work network via a sim network associated with the identity data | 240 |

| Activating, after the successful verification, the work profile | 250 |

FIG. 2

SECURELY ENABLING WORK PROFILES ON DEVICES VIA A SUBSCRIBER IDENTITY MODULE CARD

FIELD

The present teachings disclose locking a work profile unless the end-user device gains access to a work network after verification via a SIM and its associated network.

BACKGROUND

Businesses today are underserved with respect to their current mobility needs. Most of the incumbent carriers simply rewrap their consumer offers for the enterprise customer. Protecting enterprise systems and data networks in the face of changing work patterns and a Bring Your Own Device (BYOD) preference in the enterprise market is a challenge.

There is an opportunity to deliver containerized wireless services to enterprise customers for their employees by providing SIM-based, enterprise policy management and control of the wireless devices. In the present teachings, enterprises may leverage employees' personal devices for work, partitioned to provide a greater level of control and security for the use of the device for work purposes. This partitioned wireless service may be provided to the enterprises at reduced costs.

An end-user device may support a personal profile and a work profile. A work profile can be set up to separate work applications and data from personal applications and data. With a work profile a user can securely and privately use the same device for work and personal purposes. An enterprise (such as a user's work) manages, and has access to, work applications and data, while unable to access the applications, data, and usage of the personal profile which remains private.

Accessing a work network using personal devices owned by employees/contractors has become an integral part of business operations. Multiple devices and platforms can be used to connect with a work network. These devices are often configured with a work profile that allows the user to access their work networks. However, managing these work profiles and ensuring secure access to work networks can be a challenging task. Various approaches have been developed to facilitate work-related tasks on devices with work profiles. In some conventional methods, work profiles are manually enabled or disabled by the user. However, this manual process can be time-consuming and prone to errors, as users may forget to enable or disable the work profile when needed. Additionally, manually enabling or disabling the work profile may not provide a seamless transition between personal and work-related tasks.

Other existing approaches involve automatically enabling or disabling the work profile based on certain triggers or conditions. For example, the work profile may be automatically enabled when the device is connected to a specific Wi-Fi network or when a certain time of day is reached. While these approaches offer some level of automation, they may not provide sufficient security measures to protect work-related data. Furthermore, these methods do not address the need for user verification before enabling the work profile.

Another approach involves using a virtual private network (VPN) to connect to a work network. However, this method requires additional configuration and may not be suitable for all devices or network environments. Moreover, VPN-based solutions may introduce latency and performance issues, which can impact the user experience.

The prior art fails to disclose locking a work profile unless the end-user device gains access to a work network after verification via a SIM and its associated network.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A method is disclosed for facilitating work-related tasks on a device with a work profile. The method provides a secure and efficient way to manage work-related tasks on a device by ensuring that the work profile is only enabled after the user has been authenticated over the work network through the SIM network.

In some aspects, the techniques described herein relate to a method for facilitating work-related tasks with a work profile on a device including a Subscriber Identity Module (SIM), the method including: providing a work profile to access work-related tasks over a work network; retrieving identity data from the SIM; verifying the device based on the identity data; enabling, after a successful verification of the device, access to the work network via a SIM network associated with the identity data; and activating, after the successful verification, the work profile.

In some aspects, the techniques described herein relate to a method, wherein the successful verification is set to false when connectivity to the SIM network is unavailable.

In some aspects, the techniques described herein relate to a method, wherein the verifying disables the work profile based on one or more of a time of day/week, a Geofenced area, a provisioning of the SIM or a combination thereof.

In some aspects, the techniques described herein relate to a method, further including facilitating network connectivity for the work-related tasks via the SIM network.

In some aspects, the techniques described herein relate to a method, further including facilitating network connectivity for only the work-related tasks via the SIM network.

In some aspects, the techniques described herein relate to a method, wherein the verifying includes receiving the successful verification from a verification system that verifies the identity data.

In some aspects, the techniques described herein relate to a method, wherein the SIM is an eSIM.

In some aspects, the techniques described herein relate to a method, wherein the SIM network includes a cellular network.

In some aspects, the techniques described herein relate to a method, wherein the SIM network includes a slice of a cellular network.

In some aspects, the techniques described herein relate to a method, wherein the SIM network includes a wireless network.

In some aspects, the techniques described herein relate to a method, further including managing, with a verification system, work profiles and associated end-user devices within an enterprise, wherein the end-user devices are not owned by the enterprise and the work profile includes work profiles.

In some aspects, the techniques described herein relate to a system to facilitate work-related tasks with a work profile on a device including a Subscriber Identity Module (SIM), the system including: a work profile to access work-related tasks over a work network; a SIM including identity data; and a verification module to request a verification system to verify the device based on the identity data and to activate the work profile, wherein a successful verification includes enabling, for the device, access to the work network via a SIM network associated with the identity data, and wherein the verification module activates the work profile after the successful verification.

In some aspects, the techniques described herein relate to a system, wherein the verification module sets the successful verification to false when connectivity to the SIM network is unavailable.

In some aspects, the techniques described herein relate to a system, wherein the verification module disables the Work Profile based on one or more of a time of day/week, a Geofenced area, a provisioning of the SIM or a combination thereof.

In some aspects, the techniques described herein relate to a system, wherein the work profile facilitates network connectivity for the work-related tasks via the SIM network.

In some aspects, the techniques described herein relate to a system, wherein the work profile facilitates network connectivity for only the work-related tasks via the SIM network.

In some aspects, the techniques described herein relate to a system, wherein the verification system is connected to the work network.

In some aspects, the techniques described herein relate to a system, wherein the SIM network includes a cellular network.

In some aspects, the techniques described herein relate to a system, wherein the SIM network includes a slice of a cellular network.

In some aspects, the techniques described herein relate to a system, the verification system manages work profiles and associated end-user devices within an enterprise, wherein the end-user devices are not owned by the enterprise and the work profile includes the work profiles.

Additional features will be set forth in the description that follows, and in part will be apparent from the description, or may be learned by practice of what is described.

BRIEF DESCRIPTION OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates a system to facilitate work-related tasks with a work profile on a device including a Subscriber Identity Module (SIM) according to various embodiments.

FIG. 2 is a flowchart of a method for facilitating work-related tasks with a work profile on a device comprising a Subscriber Identity Module (SIM), according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically formatted device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

A work profile may be managed by an enterprise. The work Profile could be enabled to only work when within the Private Network footprint, by locking access down to only authenticate over the Work SIM network connection. Benefits of accessing with the work SIM network connection may include:

Users don't have to carry around multiple devices.

Enterprise doesn't have to buy/provide devices to users.

Work Application and/or Profile stays confined to private network footprint and connectivity.

Users do not have to pay for work usage (and employers don't have to pay for non-work usage).

Users do not have to carry around multiple devices.

Enterprise does not have to buy and provide a phone and/or full phone plan to users.

Enterprise can choose to restrict Work App/Profile usage to SIM/eSIM only (i.e. prevent users from working on an open/unsecure Wi-Fi connection)

Work Profile could be enabled to only work within a set location or Geofenced area; security of only working in authorized locations or during authorized working hours.

Work profile may be on a time of day/week lock out.

In some embodiments, the present teachings may include the following steps. A user opens an application/work profile and attempts to login. The login credentials are sent out using the work app/profile connected SIM/eSIM network and received by a verification system. An authorized or not authorized response is sent back by the verification system. Verification response is received via the work app/profile connected SIM/eSIM and if authorized, the work app or profile is unlocked and available for use. The login credentials may include identity information from the SIM/eSIM. In this exemplary use case, if work SIM/eSIM network is not available the work app/profile will not be available. In some embodiments, a user may be locked out by a geofence or time of day/week trigger.

FIG. 1 illustrates a system to facilitate work-related tasks with a work profile on a device including a Subscriber Identity Module (SIM) according to various embodiments.

A system 100 may include a device 102 including a primary SIM 104 and a work SIM 106. In some embodiments, primary SIM 104 may not be included in device 102.

Device 102 may use RF signal 112 to connect to a primary cellular network 110 based on identity data (not shown) on primary SIM 104 to access open internet 114. In some embodiments, RF signal 112 may be a Wi-Fi signal that may connect to open internet 114 without use of primary cellular network 110.

Device 102 may connect to a network 120 based on identity data 108 on work SIM 109 using RF signal 122. Network 120 facilitates access to an enterprise 130. Enterprise 130 may use a verification system 124 prior to permitting access to a work network 126 by device 102. The connection to work network 126 may be based on identity data 108 disposed on work SIM 106. In some embodiments, connection to work network 126 may be based on verifying that an intermediate node (not shown) between device 102 and enterprise 130 belongs to network 120.

Network 120 may a private cellular network, for example, a 5G network. Network 120 may be a slice of a cellular network. RF signal 122 may be a cellular signal. In some embodiments, RF signal 122 may be a Wi-Fi signal. When RF signal 122 is a Wi-Fi signal, verification system 124 may be provided identity data 108 by a work profile 128 disposed in device 102.

Verification system 124 may verify device 102 and facilitate connectivity to work network 126 based on one or more limitations. Exemplary limitations include ensuring that device 102 is within a geo-fenced location, a time-of-day of desired use, destination of a connection from a work-related task or the like.

Work profile 128 may be an application that authenticates with verification system 124. Work profile 128 may provide services to work-related tasks.

FIG. 2 is a flowchart of a method for facilitating work-related tasks with a work profile on a device comprising a Subscriber Identity Module (SIM), according to various embodiments.

A method 200 for facilitating work-related tasks with a work profile on a device comprising a SIM is disclosed. At step 210, method 200 includes providing a work profile to access work-related tasks over a work network. At step 220, method 200 includes retrieving identity data from the SIM, At step 230, method 200 includes verifying the device based on the identity data. At step 240, method 200 includes enabling, after a successful verification of the device, access to the work network via a SIM network associated with the identity data. At step 250, method 200 includes activating, after the successful verification, the work profile.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for facilitating work-related tasks with a work profile on a device comprising a Subscriber Identity Module (SIM), the method comprising:

providing a work profile to access work-related tasks over a work network;
  retrieving identity data from the SIM;
  verifying the device based on the identity data;
  enabling, after a successful verification of the device, access to the work network via a SIM network associated with the identity data; and
  activating, after the successful verification, the work profile.

2. The method of claim 1, wherein the successful verification is set to false when connectivity to the SIM network is unavailable.

3. The method of claim 1, wherein the verifying disables the work profile based on one or more of a time of day/week, a Geofenced area, a provisioning of the SIM or a combination thereof.

4. The method of claim 1, further comprising facilitating network connectivity for the work-related tasks via the SIM network.

5. The method of claim 1, further comprising facilitating network connectivity for only the work-related tasks via the SIM network.

6. The method of claim 1, wherein the verifying comprises receiving the successful verification from a verification system that verifies the identity data.

7. The method of claim 1, wherein the SIM is an eSIM.

8. The method of claim 1, wherein the SIM network comprises a cellular network.

9. The method of claim 1, wherein the SIM network comprises a slice of a cellular network.

10. The method of claim 1, wherein the SIM network comprises a wireless network.

11. The method of claim 1, further comprising managing, with a verification system, work profiles and associated end-user devices within an enterprise, wherein the end-user devices are not owned by the enterprise and the work profile comprises the work profiles.

12. A system to facilitate work-related tasks with a work profile on a device comprising a Subscriber Identity Module (SIM), the system comprising:

a work profile to access work-related tasks over a work network;
  a SIM comprising identity data; and
  a verification module to request a verification system to verify the device based on the identity data and to activate the work profile,
  wherein a successful verification comprises enabling, for the device, access to the work network via a SIM network associated with the identity data, and
  wherein the verification module activates the work profile after the successful verification.

13. The system of claim 12, wherein the verification module sets the successful verification to false when connectivity to the SIM network is unavailable.

14. The system of claim 12, wherein the verification module disables the Work Profile based on one or more of a time of day/week, a Geofenced area, a provisioning of the SIM or a combination thereof.

15. The system of claim 12, wherein the work profile facilitates network connectivity for the work-related tasks via the SIM network.

16. The system of claim 12, wherein the work profile facilitates network connectivity for only the work-related tasks via the SIM network.

17. The system of claim 12, wherein the verification system is connected to the work network.

18. The system of claim 12, wherein the SIM network comprises a cellular network.

19. The system of claim 12, wherein the SIM network comprises a slice of a cellular network.

20. The system of claim 12, the verification system manages work profiles and associated end-user devices within an enterprise, wherein the end-user devices are not owned by the enterprise and the work profile comprises the work profiles.

* * * * *